US011310040B2

United States Patent
Menon et al.

(10) Patent No.: US 11,310,040 B2
(45) Date of Patent: Apr. 19, 2022

(54) QUANTUM CIPHER BASED ON PHASE INVERSION

(71) Applicant: Parallel Wireless, Inc., Nashua, NH (US)

(72) Inventors: Vikram Menon, Karnataka (IN); Ayan Chattopadhyay, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 226 days.

(21) Appl. No.: 16/806,430

(22) Filed: Mar. 2, 2020

(65) Prior Publication Data

US 2020/0280438 A1 Sep. 3, 2020

Related U.S. Application Data

(60) Provisional application No. 62/812,359, filed on Mar. 1, 2019.

(51) Int. Cl.
| | | |
|---|---|---|
| *H04L 9/08* | (2006.01) | |
| *H04L 9/06* | (2006.01) | |
| *G06F 17/14* | (2006.01) | |
| *G06N 10/00* | (2022.01) | |

(52) U.S. Cl.
CPC .......... *H04L 9/0858* (2013.01); *G06F 17/145* (2013.01); *G06N 10/00* (2019.01); *H04L 9/06* (2013.01)

(58) Field of Classification Search
CPC ....... H04L 9/0858; H04L 9/06; H04L 9/0852; G06F 17/145; G06N 10/00
See application file for complete search history.

(56) References Cited

U.S. PATENT DOCUMENTS

| | | | |
|---|---|---|---|
| 1,310,719 A | 7/1919 | Vernam | |
| 7,028,275 B1 * | 4/2006 | Chen | G06N 10/00 716/136 |
| 2002/0106084 A1 * | 8/2002 | Azuma | B82Y 10/00 380/263 |
| 2007/0288684 A1 * | 12/2007 | Bergou | B82Y 10/00 711/101 |
| 2010/0097677 A1 * | 4/2010 | Nazarathy | G02F 3/00 359/108 |
| 2011/0142242 A1 * | 6/2011 | Tanaka | H04L 9/0858 380/282 |

(Continued)

OTHER PUBLICATIONS

Takashi Mihara, "Multi-Party Quantum Steganography", Nov. 2016, Springer Science+Business Media New York 2016, pp. 576-583. (Year: 2016).*

(Continued)

*Primary Examiner* — Matthew Smithers
(74) *Attorney, Agent, or Firm* — Michael Y. Saji; David W. Rouille

(57) ABSTRACT

Methods, systems and computer readable media are disclosed for providing a quantum cipher based on phase inversion. A shared key is established between a first party and a second party. A Hadamard transformation is applied to a message intended for a second party from the first party to produce an equal superposition state. A key phase inversion is applied to the output of the Hadamard transformation. A multiple phase inversion transformation is applied to the output of the key phase inversion to produce an encrypted quantum state with a uniform probability and relative phase distributions. The result is sent to the second party.

19 Claims, 2 Drawing Sheets

(56) References Cited

U.S. PATENT DOCUMENTS

2013/0308956 A1* 11/2013 Meyers ................. H04B 10/70
398/130
2018/0109377 A1* 4/2018 Fu ......................... H04L 9/0852

OTHER PUBLICATIONS

Godhavari et al., "Quantum Key Distribution Model using Quantum Gates", Dec. 2012, Chennai and Vivekanandha College of Technology for women, Third International Conference on Sustainable Energy and Intelligent System (SEISCON 2012), pp. 1-7. (Year: 2012).*
Huang et al., "Quantum Key Distribution Based on Multi-qubit Hadamard Matrices", 2008, IEEE, pp. 333-337. (Year: 2008).*
Rosenberg, B. Vernam cipher, a perfect cipher. http://www.cs.miami.edu/home/burt/learning/Csc609.051/notes/02.html (2004).
One time pad encryption. Mils electronic, updated. http://www.cryptomuseum.com/manuf/mils/files/mils otp proof.pdf.
Daemen, J. & Rijmen V., AES Proposal: Rijndael, AES Algorithm Submission, Sep. 3, 1999.
Bennett, C. H. & Brassard, G. in Proc. IEEE Int. Conf. on Computers, Systems and Signal Process. 175-179 (IEEE, 1984).
Shor, P. W Polynomial-time algorithms for prime factorization and discrete logarithms on a quantum computer. Siam J. Comput. 26, 1484-1509 (1997).
Abdullah, A. A, Al-Salhi, A. M. & Bermani, A. K, A New Quantum Block Encryption Algorithm Based on Quantum Key Generation, Research Journal of Applied Science 11(10), 953-958 (2016).
Shannon, C.E., Communication theory of secrecy systems, Bell System Technical Journal, vol. 28, pp. 656-715, 1949.

* cited by examiner

QUANTUM CIPHER BASED ON PHASE INVERSION

CROSS-REFERENCE TO RELATED APPLICATIONS

This application claims priority under 35 U.S.C. § 119(e) to U.S. Provisional Pat. App. No. 62/812,359, filed Mar. 1, 2019, titled "Quantum Cipher Based on Phase Inversion" which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, 71717US01, 71721US01, 71756US01, 71762US01, 71819US00, and 71820US01, respectively. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

The core idea of a cipher is that any message can be transformed into any cipher (of the same length) by a pad, such that all transformations are equally likely. The one-time pad encryption scheme is provably unbreakable if the key is at least the size of the plaintext, the key is truly random, and the key is used only once. The requirement of only one time key usage makes the one-time pad impractical when the amount of date to be securely communicated is huge.

The more practical ciphers are the block ciphers, like Data Encryption Standard (DES), Triple Data Encryption Standard (3DES), Advanced encryption Standard (AES), which operate on a block of message depending on the key size. A given key is reused for multiple message blocks. This makes the cipher prone to various kinds of attacks, like the cloning attack, cryptanalysis attack, chosen cipher-text/plaintext attack etc. The security of these ciphers depends mainly upon the strength of the key (randomness) and the algorithm used for encryption and decryption in terms of confusion and diffusion created.

The first completely secure quantum key distribution algorithm is known as the Bennet and Brassard (BB84) algorithm. A quantum algorithm was developed that can break the widely used Rivest Shamir Adleman (RSA) system, using quantum computers, with remarkable ease. Together the developments showed that a completely secure, efficient, and fast means of delivering confidential information is achievable using the laws of quantum mechanics and quantum computers. Ciphers based on quantum states, therefore, would be more appropriate because of the property that an unknown state cannot be copied. Hence, none of the attacks in classical cryptography would be applicable. In recent times there are many attempts and constructions for quantum ciphers. One such attempt was made using a quantum random number generator and half adder for encryption and transmit with the help of BB84 protocol.

SUMMARY

The presently disclosed invention relates generally to ciphers used in cryptography for secure messaging. A quantum version of a cipher used in cryptography where the message to be communicated is encoded into the relative phase of a quantum state using the shared key is disclosed. The encoded quantum information carrying the message is actually sent to the recipient over a quantum channel, assuming the proper secrecy of shared key between peers. Described herein is a technique wherein a quantum version of a cipher is proposed, which utilizes the benefit of superior delivery efficiency provided by modern telecommunication, and snoop-detection capability of the BB84 algorithm. The quantum version exploits the fact that an unknown quantum state cannot be cloned and its relative phase cannot be measured. The message to be sent is encoded into a quantum state by altering the relative phase using a pre-established shared key, via BB84 or any other quantum key distribution protocol. The information transmitted is a quantum superposition state with uniform probability and relative phase distribution.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
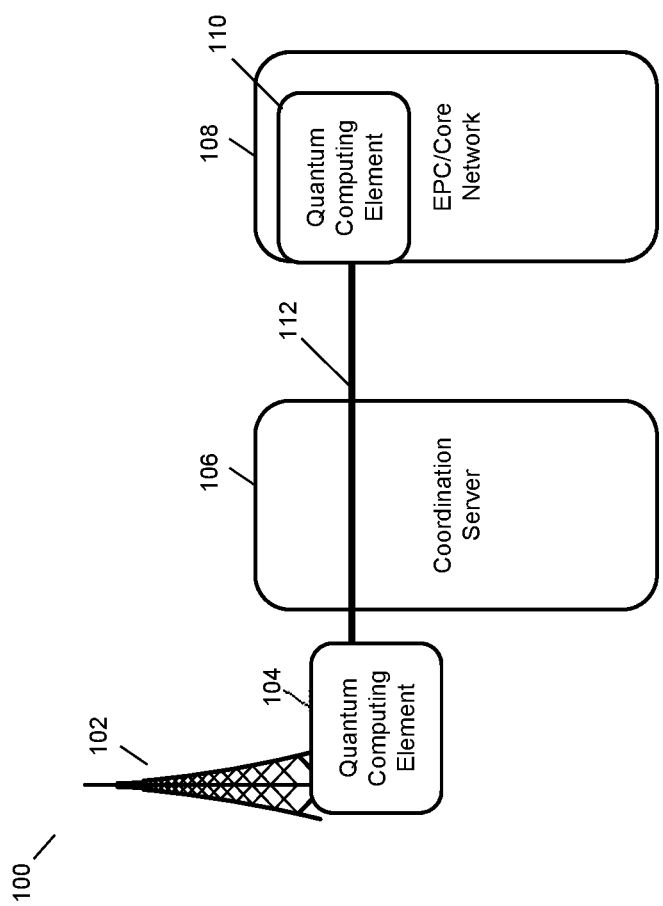
FIG. 1 depicts a diagram of an environment using quantum ciphering based on phase inversion, in accordance with some embodiments.

FIG. 1 shows an example system 100 using quantum ciphering based on phase inversion. Base station 102 includes a quantum computing element 104. The quantum computing element 104 receives a message and produces a quantum ciphered output based on phase inversion. This output is sent to quantum computing element 110 of core network 108 through coordination server 106 by way of an encrypted tunnel 112. Quantum computing element 110 converts the ciphered message based on phase inversion back to the original message.

The reverse process is also supported. The quantum computing element 110 of core network 108 receives a message and produces a quantum ciphered output based on phase inversion. This output is sent to quantum computing element 104 of base station 102 through coordination server 106 by way of an encrypted tunnel 112. Quantum computing element 104 converts the ciphered message based on phase inversion back to the original message. The presently described technique requires a pre-established shared key between the communicating parties, which can be achieved by the BB84 or similar QKD (Quantum Key Distribution) protocol. It is assumed that QKD is secured enough and it would be hard to know any information about key.

Figure 2:
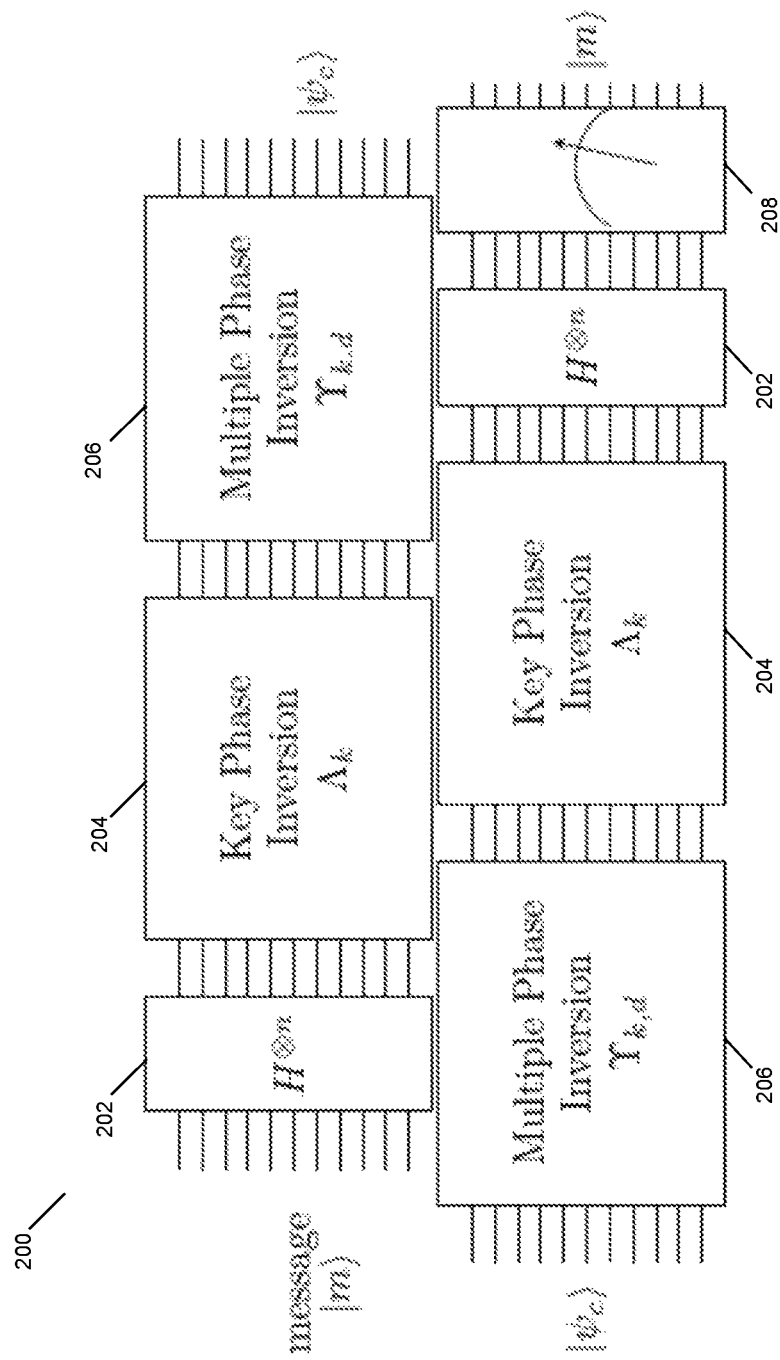
FIG. 2 is a block diagram of an environment for performing a quantum cipher based on phase inversion in accordance with an example embodiment.

As shown in FIG. 2, the components of the proposed cryptosystem 200 include a Hadamard transformation element, an Oracle, $\Lambda_k$, responsible for key state phase inversion and another oracle, $Y_{k,d}$, for multiple phase inversion.

The message m to be sent is first passed through a Hadamard transformation element 202 to create an equal superposition state. Next, the phase inversion 204 is applied to invert the key state phase. Finally, the multiple phase inversion transformation 206 (another Oracle) is applied to invert the phases of exactly half of the basis states. The outcome of this is an encrypted quantum state $|\psi_c\rangle$ with a uniform probability and relative phase distributions. The transmitted quantum state acts as a carrier for the message, analogous to the FM transmission, where the audio wave to be transmitted is encoded in the frequency of a high frequency carrier wave.

The recipient can apply the transformation to $|\psi_c\rangle$ in reverse, the multiple phase inversion 206 followed by the key phase inversion 204 and finally the Hadamard transformation 202, to retrieve the original message $|m\rangle$ 208.

The Hadamard transformation, irrespective of the input, creates an equal superposition state, i.e. a uniform distribution of all possible n-qubit states of the message space, say M, of size $$|\psi_m\rangle = H^{\otimes n}(|m\rangle) = \frac{1}{\sqrt{N}} \sum_{x=0}^{N-1} (-1)^{m \cdot x} |x\rangle$$

$$N = 2.$$

The phase inversion operator, ($\Lambda k$), acts as an oracle and is defined as $\Lambda_k = I - 2|k\rangle\langle k|$
where k is the quantum key state derived from the shared key k and I the identity operator.

The application of this operator on the input state $|\psi_m\rangle$, creates a coupling between the input state and the key state.

$$|\psi_c'\rangle = \Lambda_k |\psi_m\rangle = I|\psi_m\rangle - 2\frac{1}{\sqrt{N}} \sum_{x=0}^{N-1} (-1)^{m \cdot x} |k\rangle\langle k | x\rangle$$

$$= |\psi_m\rangle - \frac{2}{\sqrt{N}} (-1)^{m \cdot k} |k\rangle$$

This marking of the key state accomplishes the encoding. The application of the same operator retrieves the input state $|\psi_m\rangle$, $$\Lambda_k |\psi_c'\rangle = (I - 2|k\rangle\langle k|) \left( |\psi_m\rangle - \frac{2}{\sqrt{N}} (-1)^{m \cdot k} |k\rangle \right)$$

$$= |\psi_m\rangle - \frac{2}{\sqrt{N}} (-1)^{m \cdot k} |k\rangle - \frac{2}{\sqrt{N}} (-1)^{m \cdot k} |k\rangle + \frac{4}{\sqrt{N}} (-1)^{m \cdot k} |k\rangle$$

$$= |\psi_m\rangle$$

The multiple phase inversion transformation, say $\gamma_{k,d}$, performs phase inversion of multiple basis states as follows.
1. Select one r, where r|N (r divides N) and $$r < \frac{N}{2}.$$

Now say, $$d = \frac{N}{r},$$

where $N=2^n$ for n qubits.
2. Start with the key k position of the state $|\psi_c'\rangle$ and invert the phases of next d consecutive states, i.e. states $|(k+pd) \mod N\rangle$ to $|(k+(p+1)d-1) \mod N\rangle$. Skip the next d states from $|(k+(p+1)d) \mod N\rangle$ to $|(k+(p+2)d-1) \mod N\rangle$. Here $$0 \le p \le \frac{N}{2d}$$

and $p \in N \cup 0$, here N is set of natural numbers.
The transformation can be defined as
$|\psi_c\rangle - \gamma_{k,d} |\psi_c'\rangle$ The distribution of inverted vs. non-inverted phase states ($|\psi_c\rangle$, being the complete superposed states) will vary on each unique choice of key state and d. Hence, the guessing of the state distribution is not possible in this construction. It can be easily visualized that phases of half of the basis states will be inverted. 'd' can be uniquely defined for a given key and can be arrived at as part of the key exchange process.

The key state phase inversion operator, $\Lambda_k$, when applied to the state $|\psi_m\rangle$, resulted in the inversion of the key state $|k\rangle$. It can be rewritten as follows, $$|\psi_c'\rangle = \Lambda_k |\psi_m\rangle$$

$$= |\psi_m\rangle - \frac{2}{\sqrt{N}} (-1)^{m \cdot k} |k\rangle$$

$$= |\psi_{m-k}\rangle - \frac{1}{\sqrt{N}} (-1)^{m \cdot k} |k\rangle$$

where $|\psi_{m-k}\rangle = |\psi_m\rangle - \checkmark_N |k\rangle$ is the superposition of all the basis states, except the key state.

The probability of the phase inverted key state $$P_k = \frac{1}{N}$$

and each of the remaining (N−1) non-inverted states ($\forall x \in |x\rangle, k \not\subseteq x$) be $$P_x = \frac{1}{N}.$$

The ratio of the probability of inverted and non-inverted states $$\frac{P_k}{P_x} = \frac{N}{N} = 1$$

is probabilistically indistinguishable in this case.

The adversary can only see the transmitted state as he/she has the power to apply Hadamard transform on the transmitted state. However, since the adversary does not know the shared key state $|k\rangle$, $\Lambda_k$ remains private, applying Hadamard transform cannot return back the original message state $|\psi m\rangle$. The adversary can only guess the construction of $\Lambda_k$ in $O(\sqrt{N})$ running time.

Alternatively, adversary can set up chosen plaintext attack by apply inversion against mean operator to check if it could leak some information, or can guess any inherent biasness.

The inversion against mean operator is defined as $\mu_m = (2|\psi_m\rangle\langle\psi_m| - I)$, where $|\psi_m\rangle$ is total state. The inner product of key state and total state is given by $$\langle\psi_m|k\rangle = \langle k|\psi_m\rangle = \frac{1}{\sqrt{N}}.$$

The application of $\mu_m$ to the $|\psi'_c\rangle$ will result in $$|\phi_m\rangle = \mu_m|\psi'_c\rangle = (2|\psi_m\rangle\langle\psi_m| - I)\left(|\psi_m\rangle - \frac{2}{\sqrt{N}}|k\rangle\right)$$

$$= 2|\psi_m\rangle\langle\psi_m|\psi_m\rangle - 2\frac{2}{\sqrt{N}}|\psi_m\rangle\langle\psi_m|k\rangle - \left(|\psi_m\rangle + \frac{2}{\sqrt{N}}|k\rangle\right)$$

$$= \left(1 - \frac{4}{N}\right)|\psi_m\rangle + \frac{2}{\sqrt{N}}|k\rangle$$

Choosing one use case having message having all 0 i.e. $|\psi_0\rangle = H^{\otimes n}(|00\ldots0\rangle)$. The equation can then be rewritten as:

$$|\phi_0\rangle = \left(1 - \frac{4}{N}\right)|\psi_0\rangle + \frac{2}{\sqrt{N}}|k\rangle$$

To extract out non-inverted phase states, equations can be combined to get $$|\phi\rangle = \left(1 - \frac{4}{N}\right)|\psi_0\rangle + \frac{2}{\sqrt{N}}|k\rangle$$

$$= \left(1 - \frac{4}{N}\right)|\psi_{0-k}\rangle + \frac{\left(1 - \frac{4}{N}\right)}{\sqrt{N}}|k\rangle + \frac{2}{\sqrt{N}}|k\rangle$$

$$= \left(1 - \frac{4}{N}\right)|\psi_{0-k}\rangle + \frac{3N - 4}{N\sqrt{N}}|k\rangle$$

The probability of the phase inverted state is therefore given by $$P_k = \left(\frac{3N - 4}{N\sqrt{N}}\right)^2$$

and each of the remaining (N−1) non-inverted states $$(\forall x \in |x\rangle, k \not\subseteq x)$$

by $$P_x = \frac{\left(1 - \frac{4}{N}\right)^2}{N}$$

Looking for the same probability ratio yields $$\frac{P_k}{P_x} = \frac{\left(\frac{3N - 4}{N\sqrt{N}}\right)^2}{\frac{\left(1 - \frac{4}{N}\right)^2}{N}}$$

$$= \left(\frac{3N - 1}{N - 4}\right)^2$$

$$= \left(\frac{3 - \frac{4}{N}}{1 - \frac{4}{N}}\right)^2$$

which, for large N, will reduce to $$\frac{P_k}{P_x} \to 9$$

It is noticed that there is a biasness of probability distribution between phase inverted state and non-inverted state. The adversary has the freedom to apply $\mu_0$ again on the output of first $\mu_0$ operation, if doing so, it will be observed from the below result that the encrypted transmitted state would be emerged.

$$|\phi\rangle = (2|\psi_0\rangle\langle\psi_0| - I)\left(1 - \frac{4}{N}\right)|\psi_0\rangle + \frac{2}{\sqrt{N}}|k\rangle$$

$$= \left(1 - \frac{4}{N}\right)|\psi_0\rangle + \frac{4}{N}|\psi_0\rangle - \frac{2}{\sqrt{N}}|k\rangle$$

$$= |\psi_0\rangle - \frac{2}{\sqrt{N}}|k\rangle$$

With the repeated use of $\mu_0$, would emerge the above alternative pattern. Though, the adversary cannot be able to make out any useful information but it shows a little biasness in probability distribution of the inverted key states over rest of the individual (non-inverted) message states. This violates the Shannon's secrecy clause for encryption.

In order to solve the biasness problem, a user could phase invert M states and M>1. The objective is to show that if $$M = \frac{N}{2}$$

the biasness can be eliminated and we could show the inverted phase states and the rest of the states will be indistinguishable.

Multiple phase inversion is actually a chain of single phase inversion of M times with the corresponding phase inversion states are $|k_1\rangle, |k_2\rangle, \ldots |k_m\rangle$, these states remain private between the communicating parties . . . .

$$(I - |k_1\rangle\langle k_1|)|\psi_m\rangle = |\psi_m\rangle - \frac{2}{\sqrt{N}}(-1)^{m \cdot k_1}|k_1\rangle$$

$$(I - 2|k_2\rangle\langle k_2|)\left(|\psi_m\rangle - \frac{2}{\sqrt{N}}(-1)^{m \cdot k_1}|k_1\rangle\right) =$$

$$|\psi_m\rangle - \frac{2}{\sqrt{N}}(-1)^{m \cdot k_1}|k_1\rangle - \frac{2}{\sqrt{N}}(-1)^{m \cdot k_2}|k_2\rangle$$

similarly goes on up to M states and the final would look like $$(I - 2|k_m\rangle\langle k_m|)(|\psi_m\rangle - \frac{2}{\sqrt{N}}(-1)^{m \cdot k_1}|k_1\rangle$$
$$- \frac{2}{\sqrt{N}}(-1)^{m \cdot k_2}|k_2\rangle$$
$$\ldots$$
$$- \frac{2}{\sqrt{N}}(-1)^{m \cdot k_{m-1}}|k_{m-1}\rangle)$$
$$= |\psi_m\rangle - \frac{2}{\sqrt{N}}(-1)^{m \cdot k_1}|k_1\rangle - \frac{2}{\sqrt{N}}(-1)^{m \cdot k_2}|k_2\rangle$$
$$\ldots - \frac{2}{\sqrt{N}}(-1)^{m \cdot k_m}|k_m\rangle$$

Without any loss of generality, this can be expressed as $$|\phi\rangle = \Lambda_k|\psi_m\rangle = |\psi_m\rangle - \frac{2}{\sqrt{N}}\sum_{i=0}^{M-1}(-1)^{m \cdot k_i}|k_i\rangle$$
$$= |\psi_{m-k}\rangle - \frac{1}{\sqrt{N}}\sum_{i=0}^{M-1}(-1)^{m \cdot k_i}|k_i\rangle$$

Now, the probability of the M consolidated phase inverted key states is $$P_k = M \cdot \left(\frac{1}{\sqrt{N}}\right)^2$$

and (N−M) non-inverted states $$P_x = (N - M) \cdot \left(\frac{1}{\sqrt{N}}\right)^2$$

And the ratio $$\frac{P_k}{P_x} = \frac{M}{(N - M)}$$

Which reduces to $$\frac{P_k}{P_x} = 1 \text{ when } M = \frac{N}{2}.$$

Thus, there is no biasness in probability distribution between M phase inverted states with the rest of the non-inverted states. Since adversary does not know the shared key state $|k\rangle$, $\Lambda_k$ remains private, applying Hadamard transform on the transmitted message will not reveal any information. The adversary, however can chose to apply inversion against mean operator to launch 'chosen plaintext attack', taking the similar argumental approach as used during single phase inversion analysis (changing notation of $\psi_m$ to $\psi_0$), $$|\phi\rangle =$$
$$\mu_0|\psi_0\rangle = (2|\psi_0\rangle\langle\psi_0| - I)(|\psi_0\rangle - \frac{2}{\sqrt{N}}\sum_{i=0}^{M-1}(-1)^{m \cdot k_i}|k_i\rangle = 2|\psi_0\rangle\langle\psi_0|\psi_0\rangle -$$
$$2\frac{2}{\sqrt{N}}\sum_{i=0}^{M-1}(-1)^{m \cdot k_i}|\psi_0\rangle\langle\psi_0|k_i\rangle - \left(|\psi_0\rangle + \frac{2M}{\sqrt{N}}|k\rangle\right) =$$
$$\left(1 - \frac{4M}{N}\right)|\psi_0\rangle + \frac{2}{\sqrt{N}}\sum_{i=0}^{M-1}(-1)^{m \cdot k_i}|k_i\rangle$$

Since $$|\phi_0\rangle = \frac{N - M}{\sqrt{N}}|\psi_{0-k}\rangle + \frac{M}{\sqrt{N}}|k\rangle,$$

to extract inverted and non-inverted phase states, equation 16 can be re-written as:

$$|\phi\rangle = \left(1 - \frac{4M}{N}\right)|\psi_0\rangle + \frac{2}{\sqrt{N}}\sum_{i=0}^{M-1}(-1)^{m \cdot k_i}|k_i\rangle \quad (17)$$
$$= \left(1 - \frac{4M}{N}\right)|\psi_{m-k}\rangle + \left(\left(1 - \frac{4M}{N}\right)\frac{1}{\sqrt{N}} + \frac{2}{\sqrt{N}}\right)\sum_{i=0}^{M-1}(-1)^{m \cdot k_i}|k_i\rangle$$

The probability of consolidated M phase inverted states is the $$P_k = M\left(\left(1 - \frac{4M}{N}\right) \cdot \frac{1}{\sqrt{N}} + \frac{2}{\sqrt{N}}\right)^2$$

and for the N–M non-inverted states $$P_x = (N-M) \cdot \left(\left(1 - \frac{4M}{N}\right) \cdot \frac{1}{\sqrt{N}}\right)^2.$$

The ratio of probabilities is thus $$\frac{P_k}{P_x} = \frac{M\left(\left(1 - \frac{4M}{N}\right) \cdot \frac{1}{\sqrt{N}} + \frac{2}{\sqrt{N}}\right)^2}{(N-M) \cdot \left(\left(1 - \frac{4M}{N}\right) \cdot \frac{1}{\sqrt{N}}\right)^2}$$

and when $$M = \frac{N}{2},$$

it reduces to $$\frac{P_k}{P_x} = \left|\frac{\frac{N}{2}}{\frac{N}{2}}\right| = 1$$

With this construction, it can be shown that again, the relative probability distribution is not altered by no means and hence no biasness.

The above technique is secure against 'chosen plaintext' attack. Even if there will be single phase inversion, being phase inversion operator as private, key is safe to use $O(\sqrt{N})$ times in a session. The transmitted message is an equal superposition state with some co-relation to the key k. Without the knowledge of the key nothing can be inferred about the message M. To make it completely hardened, approximately half of the total phases of the Hadamard transformed message state should be inverted.

An example of the method for producing a quantum cipher based on phase inversion includes the following steps:

Begin with the BB84 quantum key distribution (QKD) method to establish a shared key k and d between two communicating parties (A and B). Let the key state be $|k\rangle$.

To each message, $m \in M$, 'A' will apply the Hadamard transform to create an equal superposition state $|\psi_m\rangle$.

$$|\psi_m\rangle = H^{\otimes n}(|m\rangle) = \frac{1}{\sqrt{N}} \sum_{x=0}^{N-1} (-1)^{m \cdot x} |x\rangle$$

Apply the operator $\Lambda k$ to $|\psi_m\rangle$ to mark the key state.

$$\Psi'_c = \Lambda_k |\psi_m\rangle = |_m\rangle 2|k\rangle$$

Apply the multiple phase inversion operator $\gamma_{k,d}$ to invert phases of multiple basis states.

$$|\psi_c\rangle = \gamma_{k,d} |\psi'_c\rangle$$

Send the resulting encrypted quantum state $|\psi_c\rangle$ to 'B' using a quantum channel.

'B' will perform the reverse operation to retrieve the message m from $|\psi_c\rangle$.

Some applications of the proposed cipher construction are as follow. Anyone can utilize this algorithm to encode and send his/her signature (public identity) as the message. The intended peer can decode the signature and verify against the known one. Any tampering of the message would result in a different signature, i.e. only an entity with the share key in possession can generate the encoded signature. For authenticated encrypted message however, total message length will be 2n with one part of n bearing the identity for signature verification.

This can be used during quantum teleportation. 'Alice' no longer needs to use phone or email to communicate 'Bob' her state of operation. Instead, she can send the cipher to Bob and Bob can 'decrypt' to get the message what Alice had performed and act accordingly to get the teleported message. Thus, all classical entities involved in quantum teleportation can be eradicated.

This can be used to refresh the shared key established by the BB84 QKD. The newly generated random key $|k_1\rangle$ can be communicated to the peer as a message in the cipher construction using the existing key $|k\rangle$. Afterwards, $|k_1\rangle$ will be the new key and will be used for next set of message encryption and decryption. In the whole process, BB84 QKD protocol is used only once.

The proposed quantum cipher is proved mathematically secured against known attacks (more relevant in the current context 'chosen plaintext attack') and can be versatile in application. The requirement of a well secure cipher, namely diffusion and confusion, is satisfied by the Hadamard and multiple phase inversion transformations respectively. The same idea can be extended and similar approach can be used for multi-party (multi peers) communication securely.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

What is claimed is:

1. A method of providing a quantum cipher based on phase inversion, the method comprising:
    establishing a shared key between a first party and a second party;
    applying a Hadamard transformation to a message intended for a second party from the first party to produce an equal superposition state;
        applying a key phase inversion to the output of the Hadamard transformation;
        applying a multiple phase inversion transformation to the output of the key phase inversion to produce an encrypted quantum state with a uniform probability and relative phase distributions; and
        sending the result to the second party.

2. The method of claim 1 wherein the applying a Hadamard transformation to a message intended for a second party from the first party to produce an equal superposition state, the applying a key phase inversion to the output of the Hadamard transformation, and the applying a multiple phase inversion to the output of the key phase inversion to produce an encrypted quantum state with a uniform probability and relative phase distributions are performed by a quantum computer.

3. The method of claim 1 wherein the quantum cipher is used for communications between a UE and a core.

4. The method of claim 1 wherein the Hadamard transformation is performed in accordance with the formula $$|\psi_m\rangle = H^{\otimes n}(|m\rangle) = \frac{1}{\sqrt{N}} \sum_{x=0}^{N-1} (-1)^{m \cdot x} |x\rangle.$$

5. The method of claim 1 wherein the key phase inversion is performed in accordance with the formula $$\Lambda_k = I - 2|k\rangle\langle k|.$$

6. The method of claim 1 wherein the multiple phase inversion transformation is performed in accordance with the formula $$|\psi_c\rangle = \gamma_{k,d} |\psi'_c\rangle.$$

7. The method of claim 1 further comprising retrieving the message from the result, the retrieving comprising:
    applying a multiple phase inversion transformation to the received message;
    applying a key phase inversion to the output of the multiple phase inversion transformation; and
    applying a Hadamard transformation to the result from the key phase inversion.

8. A system comprising:
    a UE including a first quantum computing element; and
    a core network including a second quantum computing element;
    wherein the first quantum computing element provides a quantum cipher based on phase inversion for a message sent from the UE to the core network;
    wherein the second quantum computing element provides a quantum cipher based on phase inversion for a message sent from the core network to the UE, wherein the quantum cipher based on phase inversion is provided by the method comprising: establishing a shared key between a first party and a second party: applying a Hadamard transformation to a message intended for a second party from the first party to produce an equal superposition state; applying a key phase inversion to the output of the Hadamard transformation; applying a multiple phase inversion transformation to the output of the key phase inversion to produce an encrypted quantum state with a uniform probability and relative phase distributions; and sending the result to the second party.

9. The system of claim 8 wherein the applying a Hadamard transformation to a message intended for a second party from the first party to produce an equal superposition state, the applying a key phase inversion to the output of the Hadamard transformation, and the applying a multiple phase inversion to the output of the key phase inversion to produce an encrypted quantum state with a uniform probability and relative phase distributions are performed by a quantum computer.

10. The system of claim 8 wherein the Hadamard transformation is performed in accordance with the formula $$|\psi_m\rangle = H^{\otimes n}(|m\rangle) = \frac{1}{\sqrt{N}} \sum_{x=0}^{N-1} (-1)^{m \cdot x} |x\rangle.$$

11. The system of claim 8 wherein the key phase inversion is performed in accordance with the formula $$\Lambda_k = I - 2|k\rangle\langle k|.$$

12. The system of claim 8 wherein the multiple phase inversion transformation is performed in accordance with the formula $$|\psi_c\rangle = \gamma_{k,d} |\psi'_c\rangle.$$

13. The system of claim 8 further comprising retrieving a message that has been transformed into a quantum cipher based on phase inversion, the retrieving comprising:
    applying a multiple phase inversion transformation to the received message;
    applying a key phase inversion to the output of the multiple phase inversion transformation; and applying a Hadamard transformation to the result from the key phase inversion to obtain the original message.

14. A non-transitory computer-readable medium containing instructions which,
when executed, cause a quantum computing element to perform steps comprising:
establishing a shared key between a first party and a second party;
applying a Hadamard transformation to a message intended for a second party from the first party to produce an equal superposition state;
applying a key phase inversion to the output of the Hadamard transformation;
applying a multiple phase inversion transformation to the output of the key phase inversion to produce an encrypted quantum state with a uniform probability and relative phase distributions; and
sending the result to the second party.

15. The non-transitory computer-readable medium of claim 14 further comprising instructions wherein the applying a Hadamard transformation to a message intended for a second party from the first party to produce an equal superposition state, the applying a key phase inversion to the output of the Hadamard transformation, and the applying a multiple phase inversion to the output of the key phase inversion to produce an encrypted quantum state with a uniform probability and relative phase distributions are performed by a quantum computer.

16. The non-transitory computer-readable medium of claim 14 further comprising instructions wherein the Hadamard transformation is performed in accordance with the formula $$|\psi_m\rangle = H^{\otimes n}(|m\rangle) = \frac{1}{\sqrt{N}} \sum_{x=0}^{N-1} (-1)^{m \cdot x} |x\rangle.$$

17. The non-transitory computer-readable medium of claim 14 further comprising instructions wherein the key phase inversion is performed in accordance with the formula
$\Lambda_k = I - 2|k\rangle\langle k|.$ 18. The non-transitory computer-readable medium of claim 14 further comprising instructions wherein the multiple phase inversion transformation is performed in accordance with the formula
$|\psi_c\rangle = \gamma_{k,d} |\psi'_c\rangle.$ 19. The non-transitory computer-readable medium of claim 14 further comprising instructions for retrieving the message from the result, the retrieving comprising:
applying a multiple phase inversion transformation to the received message;
applying a key phase inversion to the output of the multiple phase inversion transformation; and
applying a Hadamard transformation to the result from the key phase inversion.

* * * * *